July 18, 1967

J. C. WIGGINS ET AL 3,331,298

COMPOSITE PICTURE CAMERA

Filed June 30, 1965

INVENTORS
JEROME C. WIGGINS, STEPHEN RICHIE
AND AUGUST G. TICHACEK
BY

ATTORNEY

United States Patent Office 3,331,298
Patented July 18, 1967

3,331,298
COMPOSITE PICTURE CAMERA
Jerome C. Wiggins, Affton, and Stephen E. Richie and August G. Tichacek, St. Louis, Mo., assignors to Maritz, Inc., St. Louis, Mo., a corporation of Missouri
Filed June 30, 1965, Ser. No. 468,368
13 Claims. (Cl. 95—1)

ABSTRACT OF THE DISCLOSURE

A camera having a movable transparency holder which carries a transparency, the holder being adapted to move the transparency from an upper position adjacent the film to a lower remote position. In the upper position an object in front of the lens is back-lighted so that the object is silhouetted on the transparency and the remaining non-silhouetted portion of the transparency is cast as an image on the film. In the lower position the object is front-lighted exposing the silhouetted portion of the film. The transition from the upper to the lower position occurs very rapidly. The flash lamps for front-lighting the object are energized by the transparency holder after it clears its upper position but before it comes to rest in its lower position.

---

This invention relates to cameras, and more particularly to cameras for combining pictorial representations.

Briefly, the present invention provides a camera for use in putting subjects in a studio against a "location" background.

Among the objects of the invention are the provision of a camera for combining two pictorial representations on a single negative; the provision of a photographic apparatus assembly for producing a picture of a subject in a studio against a location background; the provision of a camera and system for superimposing a desired main subject on a selected background; the provision of apparatus of the type indicated which may be easily constructed, is reliable in operation and is not likely to become damaged. Other objects and features will be in part apparent and in part pointed out hereinafter.

The invention accordingly comprises the constructions hereinafter described, the scope of the invention being indicated in the following claims.

In the accompanying drawing, in which one of various possible embodiments of the invention is illustrated, FIG. 1 is a rear elevation of the camera of the present invention;

Corresponding reference characters indicate corresponding parts throughout the drawing.

For many purposes it is desired to produce composite pictures consisting of a main subject and a particular background. If these can be prepared without the necessity for bringing the main subject to the background desired, a great saving is secured. A process has been developed for doing this by the use of a transparency which furnishes the background, and a camera combination which, in effect, double exposes a film to form a composite negative directly, rather than using one of the more lengthy and complicated processes of combining prints of two different pictures, for example.

Essentially, the process of forming a composite negative is carried out by exposing the film in two steps. The film is first exposed, with a colored transparency in place, by means of a flash which silhouettes a figure in the studio, rather than illuminating it. The transparency is then removed and the film is again exposed but this time with a flash which illuminates the studio figure. This fills in the silhouetted areas formed by the first flash.

Figure 1:
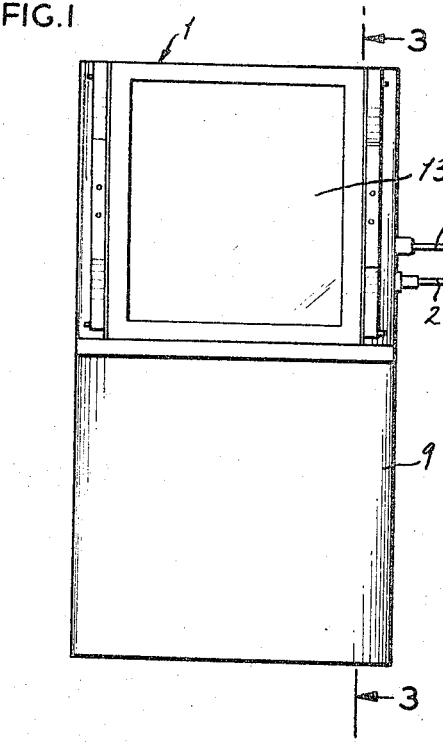
Figure 2:
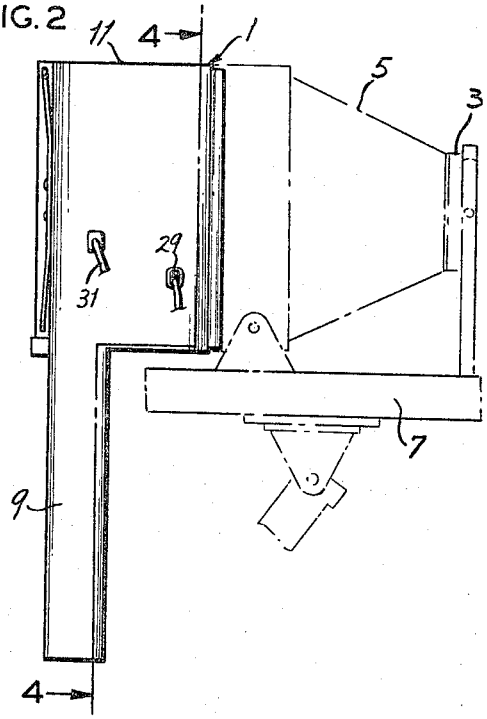
FIG. 2 is a side elevation.
Figure 3:
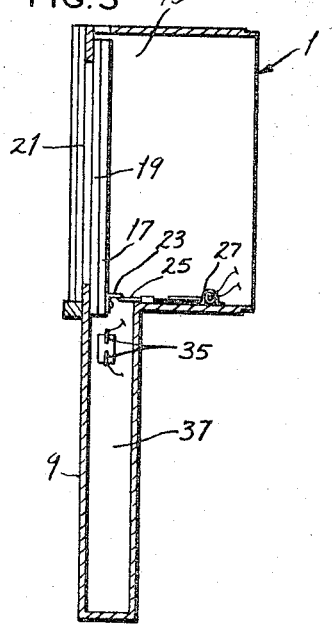
FIG. 3 is a section taken on line 3—3 of FIG. 1.
Figure 4:
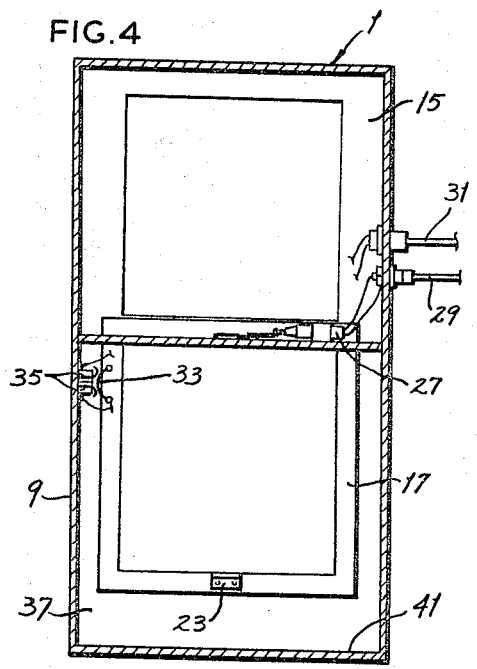
FIG. 4 is a section taken on line 4—4 of FIG. 2.

Referring now to the drawings, a standard studio camera 1 is shown having the customary lens supporting assembly 3 and bellows 5 components. It also has the bellows positioning drop bed 7 shown in dotted lines on FIG. 2. Attached to the camera back, however, is a box-shaped unit 9 which is located between the main camera box 11 and the focusing panel 13. Box 9 consists of an upper portion 15 designed for the reception of a holder 17 which will position a selected transparency 19 in the focal plane at the back of the camera just in front of film 21. Transparency holder 17 is provided with a bracket 23 which cooperates with a cam detent 25 to hold or restrain the transparency in position in front of film 21. Detent 25 is mechanically connected so as to be operated by a solenoid 27, which is in turn connected to the shutter release 29. The shutter release is in turn connected to flash control mechanism 31, which operates one set of flashlights (not shown).

Holder 17 also carries a flexible electrical contact closing bar 33. This is positioned to cooperate with electric contacts 35 located in the lower portion 37 of box 9. Contacts 35 are connected to a second group of flashlights (not shown).

The auxiliary equipment employed with the camera of the present invention is similar to that used in carrying out the process summarized above. This consists of two sets of flashlights, one of which is connected to control mechanism 31, and the other to contacts 35. The flashlights connected to control 31 are positioned behind the model which is in front of the camera, and when fired, these lights silhouette the model, but the subject matter of transparency 19 is received by film 21 except for the areas which are silhouetted by the model. Operation of release 29 which fires the flashlights connected to control 31 also energizes solenoid 27. This moves detent 25 so that it no longer supports bracket 23, and transparency 19 and its holder 17 both fall by gravity into the portion 37 of box 9. As holder 17 and transparency 19 fall, bar 33 is brought up against contacts 35 thereby firing the second group of flashlights. These flashlights are positioned so that they illuminate the model, and this fills in the areas which had been silhouetted by the first group of flashlights. The picture is now completed on film 21.

It is to be noted that bar 33 is located near the top of holder 17 so that transparency 19 completely clears the exposure area of film 21 before a circuit is closed at contacts 35. Furthermore, the lower portion 37 of box 9 is deep enough so that a circuit is closed by bar 33 thereby firing the flashlights electrically connected to contacts 35 before holder 17 can reach bottom 41 of box 9. This means that the picture is completed on film 21 before any motion is transmitted to the camera mechanism by holder 17 reaching the bottom 41 of box 9.

The operation of the camera of the present invention is as follows:

A transparency of the desired background is inserted into holder 17, and the holder is positioned above detent 25. The principal subject for the picture is then positioned before the camera, and a set of electronic flashlights is located behind the subject. A screen is employed behind the subject to secure even illumination. The flashlights operating behind the subject silhouette the model and expose film 21 to the subject matter of the transparency, except for the areas which are silhouetted by the model.

An additional set of electronic flashlights is located between the model and the camera so that they illuminate the model. The first set of flashlights is connected to flash control mechanism 31, while the second set of flashlights is connected to contacts 35.

After the camera has been focused in the customary manner, the shutter release 29 is operated thereby operating flash control mechanism 31 and firing the first set of flashlights. This silhouettes the model and the subject matter of transparency 19 is received by film 21 except for the areas which have been silhouetted. The operation of release 29 not only fires the flashlights connected to control 31, but energizes solenoid 27, which moves detent 25 so that it no longer supports bracket 23. Transparency 19 and its holder 17 thereupon fall by gravity and as holder 17 nears bottom 41, bar 33 is brought against contacts 35 closing this circuit and firing the second group of flashlights. These lights illuminate the model and fill in the areas of film 21 which had previously been silhouetted. The shutter is then closed by the shutter mechanism and the picture is complete on film 21.

It will be readily aparent that the camera of the present invention may be utilized to make composite pictures utilizing various types of film. The shutter mechanism is timed so that the cycle of operation is completed before it closes.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a camera, a film holder means for holding a transparency adjacent the film, means for releasing the transparency from its position adjacent the film and permitting it to fall away from the film, and means for closing a circuit adapted for connection to a light source positioned so as to front-light an object located within the field of the camera's lens, said last-named means being operated by the fall of said transparency away from the film.

2. A camera comprising film holding means, a holder for positioning a transparency adjacent to said film, detent means for retaining said transparency holder in position adjacent to said film, a circuit connected to said detent for releasing the transparency holder, and circuit closing means on said transparency holder to close a second circuit as the holder drops when released by said detent, the second circuit being adapted for connection to a light source positioned so as to front-light an object located within the field of the camera's lens.

3. A camera with a box-shaped unit located between the main camera box and the focusing panel, a holder for a transparency in the box-shaped unit, detent means for restraining the holder in a position adjacent the focusing panel so that the transparency will cast an image on the focusing panel, means for releasing said holder upon actuation of the shutter mechanism of the camera so that the holder is free to move away from the focusing panel, and circuit closing means carried by said holder and adapted to close a circuit having a flash mechanism therein, said circuit being independent of the shutter.

4. A camera with a box-shaped unit located between the main camera box and the focusing panel, a holder for a transparency in the box-shaped unit, said holder positioning the transparency in the focal plane at the back of the camera, detent means for restraining the holder, means for releasing the holder upon actuation of the shuttter mechanism of the camera, a first circuit closing means and a second circuit closing means, said first circuit closing means being actuated by the opening of the shutter by the shuttter mechanism for operating a first flash mechanism, said second circuit closing means being actuated by the holder to operate a second flash mechanism after the operation of the first circuit closing means and after the opening of the shutter.

5. In a camera, means for holding a transparency adjacent the film and in the focal plane at the back of the camera, means for releasing the transparency from its said position and permitting it to fall away from the film, a first circuit closing means and a second circuit closing means, said first circuit closing means operating upon actuation of the shutter mechanism of the camera to operate a first flash mechanism, said second circuit closing means being operated by the fall of said transparency away from the film to operate a second flash mechanism after the operation of the first flash mechanism and after the opening of the shutter.

6. A camera comprising film holding means, a holder for a transparency adjacent to said film and in the focal plane at the back of the camera, detent means for retaining said transparency holder in position adjacent to said film, a first circuit and a second circuit, said first circuit being connected to means for releasing said detent, said first circuit also being connected to the shutter mechanism of the camera and to flash mechanism, said second circuit being connected to a second flash mechanism and circuit closing means on said transparency holder for closing said second circuit independently of the opening of the shutter.

7. For use with first and second light sources adapted to respectively back- and front-light a selected object, a camera adapted to superimpose on a single photographic film an image of the object and a pictorial representation of a selected transparency; said camera comprising a housing, a lens on the housing, a film holder mounted on the housing for holding a photographic film at the focal plane of the lens, a transparency holder shiftably mounted within the housing for holding the selected transparency, the transparency holder being movable from an upper position wherein the transparency is located intermediate the lens and film holder so that light rays entering the lens will cast an image of the transparency on the film to a lower position wherein the transparency and transparency holder do not obstruct the light rays cast upon the film by the lens, restraining means for holding the transparency holder in its upper position and being adapted to release the transparency holder after the second light source has been energized whereby when the holder is in the upper position the object is silhouetted against the film and transparency and the non-silhouetted portion of the transparency is illuminated, and means for causing the second light source to be energized as the transparency holder falls to the lower position.

8. A camera according to claim 7 in which the transparency holder when in the upper position holds the transparency substantially at the focal plane of the lens.

9. A camera according to claim 8 in which the means for causing the second light source to be energized is actuated by the transparency holder after it clears its upper position and before it comes to rest in its lower position.

10. A camera according to claim 9 wherein the transparency holder is slidably mounted for vertical shifting movement.

11. A camera according to claim 10 and further characterized by a shutter, the restraining means being operatively connected to the shutter so that the transparency holder is released when the shutter opens.

12. A camera according to claim 11 wherein the first light source is a flash-type light and is operatively connected to the shutter which causes it to be energized at substantially the same instant it causes the restraining means to release the transparency holder.

13. A camera according to claim 12 wherein the second light source is a flash-type light, and wherein the means for causing the second light source to be energized is actuated by the transparency holder after it clears its upper position and before it comes to rest in its second position.

References Cited
UNITED STATES PATENTS

| | | | |
|---|---|---|---|
| 2,705,907 | 4/1955 | Caps et al. | 95—14 |
| 3,039,357 | 6/1962 | Eagle | 352—89 |

NORTON ANSHER, *Primary Examiner.*

RICHARD M. SHEER, *Assistant Examiner.*